(12) United States Patent
Doering et al.

(10) Patent No.: US 9,347,557 B2
(45) Date of Patent: May 24, 2016

(54) TRANSMISSION GEAR SHIFT INDICATION ADJUSTMENT

(71) Applicant: Ford Global Technologies, LLC, Dearborn, MI (US)

(72) Inventors: Jeffrey Allen Doering, Canton, MI (US); Davor Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 13/767,773

(22) Filed: Feb. 14, 2013

(65) Prior Publication Data

US 2014/0229076 A1 Aug. 14, 2014

(51) Int. Cl.
| | |
|---|---|
| G06F 17/00 | (2006.01) |
| F16H 63/42 | (2006.01) |
| F16H 61/24 | (2006.01) |
| F16H 61/04 | (2006.01) |

(52) U.S. Cl.
CPC ........ *F16H 63/42* (2013.01); *F16H 2061/0492* (2013.01); *F16H 2061/248* (2013.01)

(58) Field of Classification Search
CPC ........ B60Q 5/00; B60Q 9/00; F02M 35/1294; G06F 17/00; G10K 15/02; H04R 2499/13
USPC .......................................... 701/36, 51, 55, 58
See application file for complete search history.

(56) References Cited

U.S. PATENT DOCUMENTS

| | | | | |
|---|---|---|---|---|
| 6,961,647 | B2 * | 11/2005 | Matsumura et al. | 701/55 |
| 7,979,147 | B1 * | 7/2011 | Dunn | 700/94 |
| 8,009,839 | B2 * | 8/2011 | Hagen | 381/86 |
| 2003/0100985 | A1 * | 5/2003 | Matsumura et al. | 701/55 |
| 2005/0029023 | A1 * | 2/2005 | Takami et al. | 180/65.3 |
| 2008/0042821 | A1 * | 2/2008 | Kaya | 340/459 |
| 2011/0085674 | A1 * | 4/2011 | Fujikawa | 381/86 |
| 2011/0087403 | A1 * | 4/2011 | Fujikawa | 701/36 |
| 2011/0190991 | A1 * | 8/2011 | Araki et al. | 701/58 |
| 2013/0294619 | A1 * | 11/2013 | Valeri et al. | 381/86 |
| 2014/0121896 | A1 * | 5/2014 | Valeri et al. | 701/36 |

FOREIGN PATENT DOCUMENTS

| | | |
|---|---|---|
| EP | 1314915 B1 | 4/2008 |
| EP | 1921350 B1 | 8/2011 |

OTHER PUBLICATIONS

Anonymous, "Intermediate Torque Transfer in 4-Element Power-On Downshift," IPCOM No. 000239992, Published Dec. 19, 2014, 2 pages.

* cited by examiner

*Primary Examiner* — Thomas G Black
*Assistant Examiner* — Ce Li
(74) *Attorney, Agent, or Firm* — Greg Brown; Alleman Hall McCoy Russell & Tuttle LLP (57) ABSTRACT

Methods and systems are provided for operating a vehicle with a transmission. In one example approach, a method for a vehicle comprises, during a transmission shift having a first engine speed profile, adjusting a transmission shift indication provided to a vehicle operator based on a desired perceived shift time and a desired engine deceleration rate.

18 Claims, 5 Drawing Sheets

TRANSMISSION GEAR SHIFT INDICATION ADJUSTMENT

BACKGROUND AND SUMMARY

Vehicles with engines may include transmission systems, e.g., automatic transmission systems, which may adjust a transmission gear ratio in response to engine operating conditions, e.g., in response to changes in vehicle speed, engine speed, vehicle and engine loads, accelerator pedal position, shift lever/paddle position, etc. During some conditions, e.g., in response to an increased vehicle speed, an automatic transmission system may initiate an upshift from a first gear ratio to a second, lower gear ratio. A driver's perception of the duration of an upshift on a transmission may be largely based on visual information received from an engine RPM display device, e.g., a tachometer, and audible indications of a change in engine speed, e.g., changes in audible engine frequencies. For example, during a slowly changing accelerator pedal position, a well-executed upshift may result in very little disturbance in output shaft torque or seat track acceleration. The actual shift has a torque phase and an inertia phase, where the engine speed and transmission speed ratio change during the inertia phase.

However, the inventors herein have recognized that during some conditions a driver may desire quick, smooth, and/or consistent upshifts, especially at high pedal demand, when in 'sport' mode, or when driving transmissions that are marketed as being sporty, for example. The perceived quickness of the shifts is related to the duration of the inertia phase of the gear shift. The powertrain behavior during the inertia phase may be limited and may vary based on engine operating conditions, vehicle loads, engine calibration, emissions constraints, and other factors that will vary from application to application or over time in a given vehicle.

Further, an RPM display device in a vehicle, e.g., a tachometer, may have delays in displaying a current engine RPM to a driver of the vehicle, e.g., during a gear shift. For example, mechanical delays may cause a tachometer to report a delayed or lagged engine RPM to a driver during a gear shift change. Further still, in some examples, various filters may be applied to a signal provided to an RPM display device to reduce noise or other disturbances in the signal so that a clearer or more consistent indication of RPM may be displayed to a driver. However, such filters may cause further delays in indicating a current RPM of the engine during a shift change, for example. Thus, it may be desirable to have a continuous, consistent, and smooth display of engine RPM to the driver in order to increase a satisfaction of the driver with vehicle and engine performance.

In one example approach, to at least partially address these issues, a method for a vehicle comprises, during a transmission shift having a first engine speed profile, adjusting a transmission shift indication provided to a vehicle operator based on a desired perceived shift time and a desired engine deceleration rate. For example, an engine speed profile displayed to the vehicle operator and/or a transmission shift noise profile provided to the vehicle operator may be adjusted.

In this way, engine performance during a gear shift may be indicated to a driver in a quick, smooth, and/or consistent way, particularly during a high accelerator pedal demand. For example, a duration of the inertia phase as displayed to a driver may be adjusted. Further, delays in indicating engine speed changes to a driver may be reduced to provide a clearer or more consistent indication of engine RPM response as displayed to a driver. For example, the engine speed as displayed on the tachometer may be adjusted to reflect a desired engine speed profile during an upshift so that the engine speed drops in a quick, consistent way. Further, in some examples, an engine sound profile at the driver's ear may be adjusted to reflect changes in engine frequencies corresponding to engine deceleration during the inertia phase. For example, the engine sound provided to a driver may be adjusted to match the profile displayed on the tachometer. In this way, clear, quick, smooth, and consistent indications of engine performance during a gear shift may be indicated to a driver while controlling the powertrain for tactilely smooth, robust shifts to increase a satisfaction of the driver with vehicle and engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
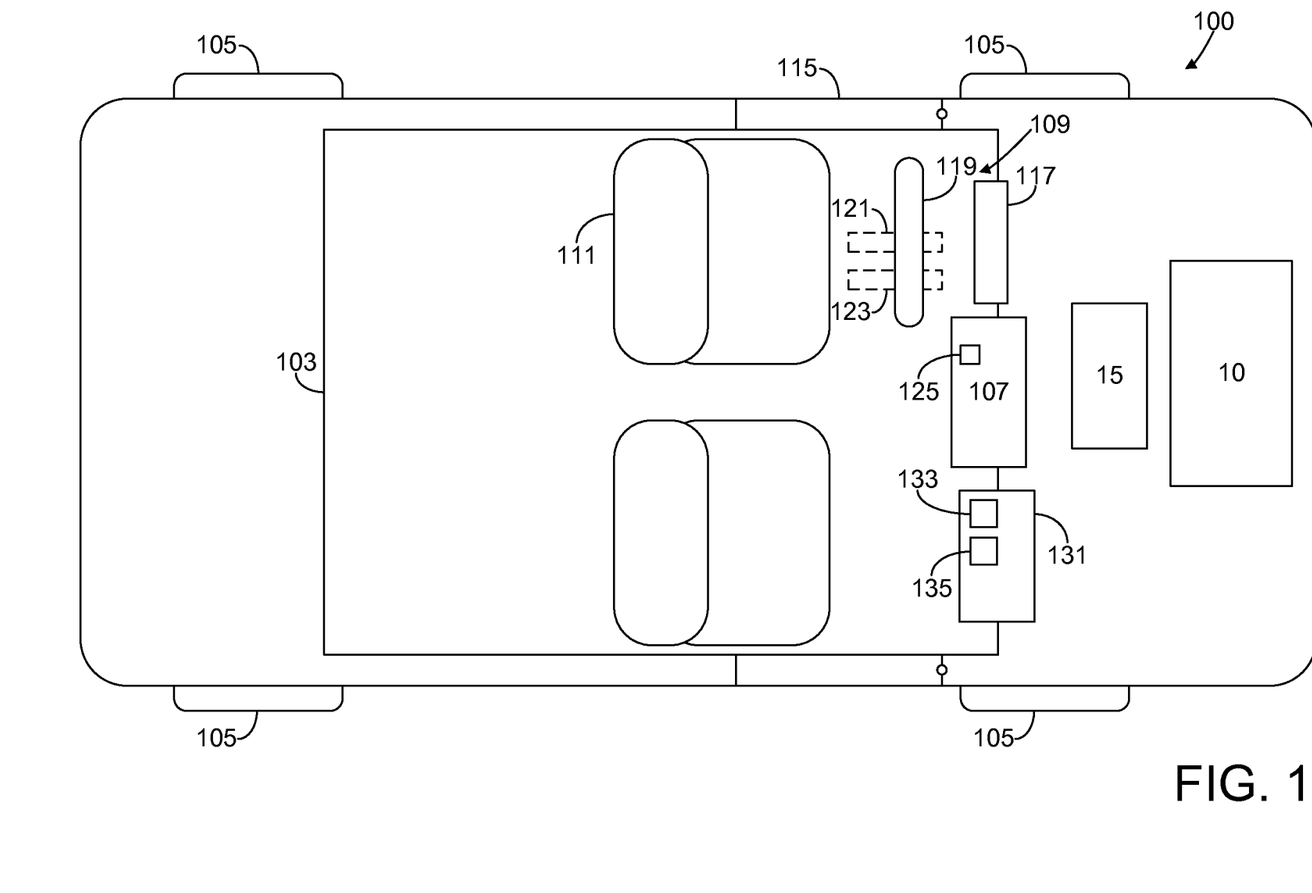
FIG. 1 shows a schematic depiction of an example vehicle system in accordance with the disclosure.
Figure 2:
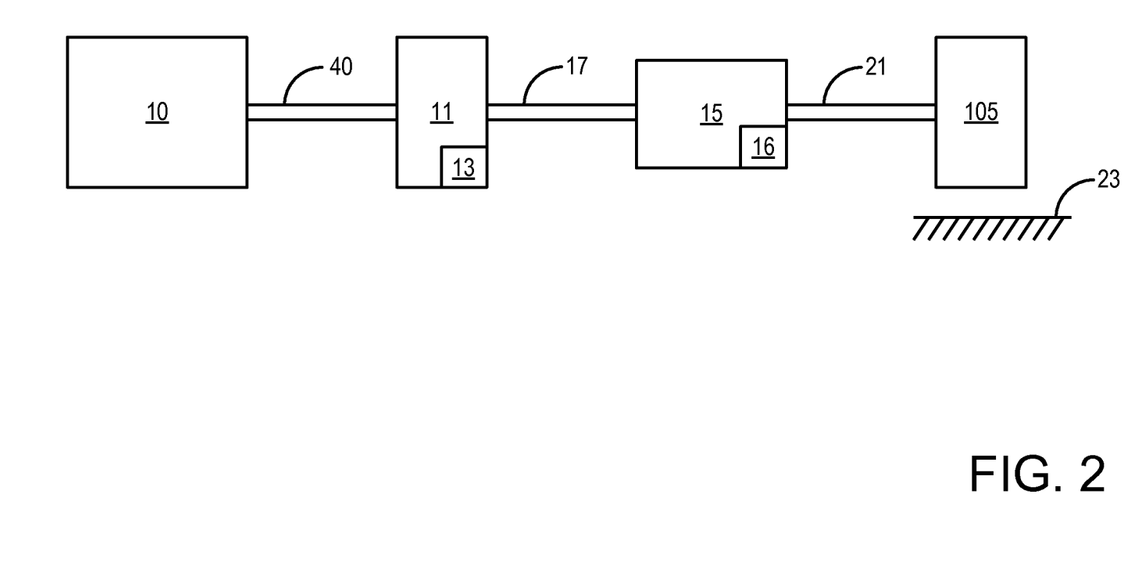
FIG. 2 shows a block diagram of a vehicle illustrating various power-train components.

The following description relates to operating a vehicle, such as the example vehicle shown in FIG. 1, with a transmission system, such as the transmission system shown in FIG. 2. For example, the transmission system may be an automatic transmission system which may be used to adjust a transmission gear ratio in response to operating conditions of an engine, such as the example engine shown in FIG. 3. As described with reference to FIGS. 4 and 5, indications of engine and vehicle performance provided to a vehicle operator during a gear shift, e.g., during an upshift, may be adjusted in order to provide clear, quick, smooth, and consistent indications to the vehicle operator while controlling the powertrain for tactilely smooth, robust shifts to increase a satisfaction of the driver with vehicle and engine performance.

Turning now to the figures, FIG. 1 shows an example vehicle 100 with an engine 10 and a transmission system 15. Vehicle 100 may be any suitable vehicle with any suitable engine, e.g., a diesel or gasoline engine. An example engine is described in more detail below with regard to FIG. 3.

Vehicle 100 has drive wheels 105 and a passenger cabin 103. Passenger cabin 103 may include one or more seats, e.g., a vehicle operator, or driver, seat 111 adjacent to vehicle operator controls 109. Vehicle 100 may further include one or more doors, for example, a vehicle door 115 adjacent to driver seat 111.

Vehicle operator controls 109 may include any suitable input devices used by an operator of vehicle 100 to control operation of vehicle 100 and/or to initiate vehicle control strategies. For example, vehicle operator controls may include a steering wheel 119, an accelerator pedal 123, a brake pedal 121, and an operation mode input device 117. For example, operation mode input device 117 may include a PRNDL selector or a gear shifting device. Further, in some examples, operation mode input device 117 may include a mode selection device so that a driver of vehicle 100 may select a mode of operation, e.g., a transmission mode of operation such as a sport mode or an FE mode. Other example vehicle operator controls include a gear shifting apparatus, a clutch pedal, a cruise control actuation and control device, etc.

Vehicle 100 may further include an instrument cluster 107 which may include a tachometer 125 configured to display engine speed or RPM to a driver of the vehicle. As further examples, instrument cluster 107 may display vehicle speed, fuel level, oil temperature, and other vehicle and engine performance information to the driver.

Vehicle 100 may further include a noise control system 131, e.g., an active noise control system, which may include speakers 135 and microphones 133. For example, microphones 133 may be used to monitor sounds from engine 10 and/or sounds within passenger cabin 103 which may be used to adjust a sound output from speakers 135 to control noise and sounds within the cabin 103, e.g., adjacent to an ear of a driver of the vehicle. For example, noise control system 131 may be used to adjust a transmission noise profile during a gear change as described in more detail below with regard to FIG. 4.

Figure 3:
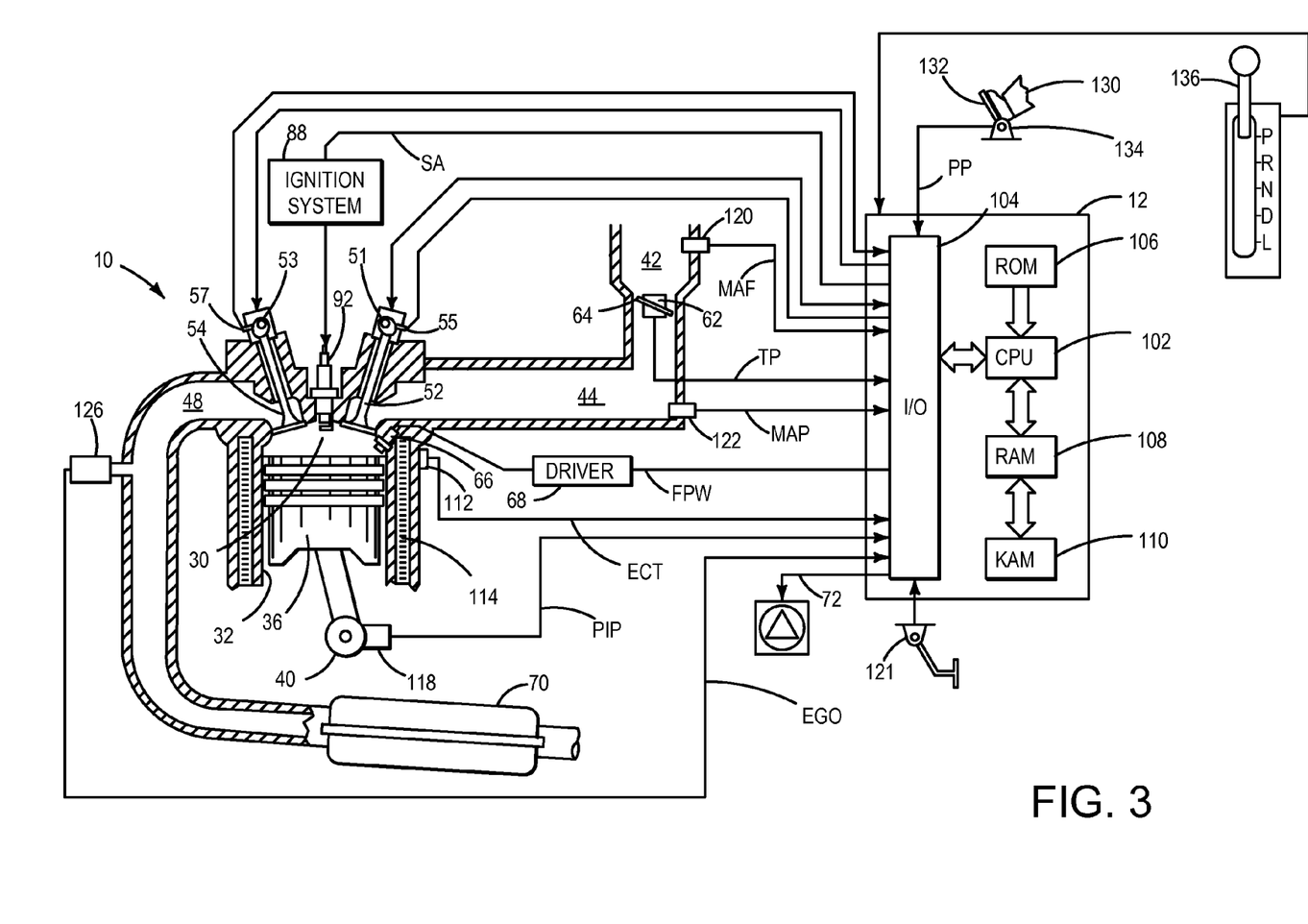
FIG. 3 shows a schematic diagram of an engine.

Referring to FIG. 2, internal combustion engine 10, further described herein with particular reference to FIG. 3, is shown coupled to torque converter 11 via crankshaft 40. Specifically, engine 10 is coupled to a pump of torque converter 11. Thus, a torque converter input speed (or pump speed) may be based on (or inferred from) engine speed. Torque converter 11 is also coupled to transmission 15 via a transmission input shaft 17. Specifically, transmission input shaft 17 couples transmission 15 to a turbine of torque converter 11. Thus, a torque converter output speed (or turbine speed) may be based on (or inferred from) a transmission input shaft speed. Torque converter 11 has a lock-up clutch 13 which can be engaged, disengaged, or partially engaged. When the clutch 13 is disengaged, the torque converter is said to be in an unlocked state. In one example, torque converter 11 is a component of transmission 15 and the torque converter lock-up clutch 13 is a transmission clutch.

Transmission 15 may be an automatic stepped gear ratio transmission. For example, transmission 15 may be an electronically controlled transmission with a plurality of selectable discrete gear ratios. Transmission 15 may also comprise various other gears, such as, for example, a final drive ratio (not shown). Alternatively, transmission 15 may be a continuously variable transmission (CVT). Transmission 15 may include a plurality of transmission clutches including a forward clutch 16. A degree of engagement of forward clutch 16 may be adjusted by varying a clutch pressure to thereby adjust a torque transmitted through transmission 15.

Transmission 15 may be further coupled to tire 105 via axle 21. Tire 105 interfaces the vehicle (e.g., vehicle 100) to the road 23. Note that in one example embodiment, this powertrain is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

FIG. 3 is a schematic diagram showing one cylinder of multi-cylinder engine 10, which may be included in a propulsion system of an automobile. Engine 10 may be controlled at least partially by a control system including controller 12 and by input from a vehicle operator 130 via an input device. In one example, the input device includes an accelerator pedal 132 and a pedal position sensor 134 for generating a proportional pedal position signal PP. In another example, the input device includes a transmission lever 136 that may be shifted between different gear options by the driver based on a desired transmission output. In one preferred embodiment, the driver may have the following driver selectable options: park (P), reverse (R), neutral (N), driver (D), and low (L). In the depicted embodiment, the lever is known as a PRNDL lever, corresponding to the different options. In one example, when in park or neutral, substantially no torque may be transmitted from the engine to the transmission output. In drive, an electronic controller can control the transmission to select any available forward gear ratios. In reverse, a single reverse gear is selected. In low, only a lower set of forward gear ratios can be selected by the electronic controller. In some embodiments, there may be a low 1 and low 2 option. Transmission lever 136 may be located on a steering column or between driver and passenger seats.

Combustion chamber 30 of engine 10 may include cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. Exhaust camshaft 53 operates exhaust valve 54 in accordance with the profile of a cam located along the length of the exhaust camshaft. Intake camshaft 51 operates intake valve 52 in accordance with the profile of a cam located along the length of the camshaft. Exhaust cam position sensor 57 and intake cam position sensor 55 relay respective camshaft positions to controller 12. Pump 72 supplies oil to index intake camshaft 51 and exhaust camshaft 53 relative to crankshaft 40 based on commands to camshaft actuators (not shown) supplied by controller 12. Pump 72 may be electrically driven so that camshafts may be indexed when engine 10 is not rotating.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 3 as a microcomputer, including microprocessor unit 102, input/output ports 104, an electronic storage medium for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; vehicle brake 121; a profile ignition pickup signal (PIP) from Hall effect sensor 118 (or other type) coupled to crankshaft 40; throttle position (TP) from a throttle position sensor; and absolute manifold pressure signal, MAP, from manifold pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor unit 102 for performing the methods described below as well as other variants that are anticipated but not specifically listed.

Controller 12 also receives signals from and provides control signals to a transmission (not shown). Transmission signals may include but are not limited to transmission input and output speeds, signals for regulating transmission line pressure (e.g., fluid pressure supplied to transmission clutches), and signals for controlling pressure supplied to clutches for actuating transmission gears.

As described above, FIG. 3 shows only one cylinder of a multi-cylinder engine, and that each cylinder may similarly include its own set of intake/exhaust valves, fuel injector, spark plug, etc.

Figure 4:
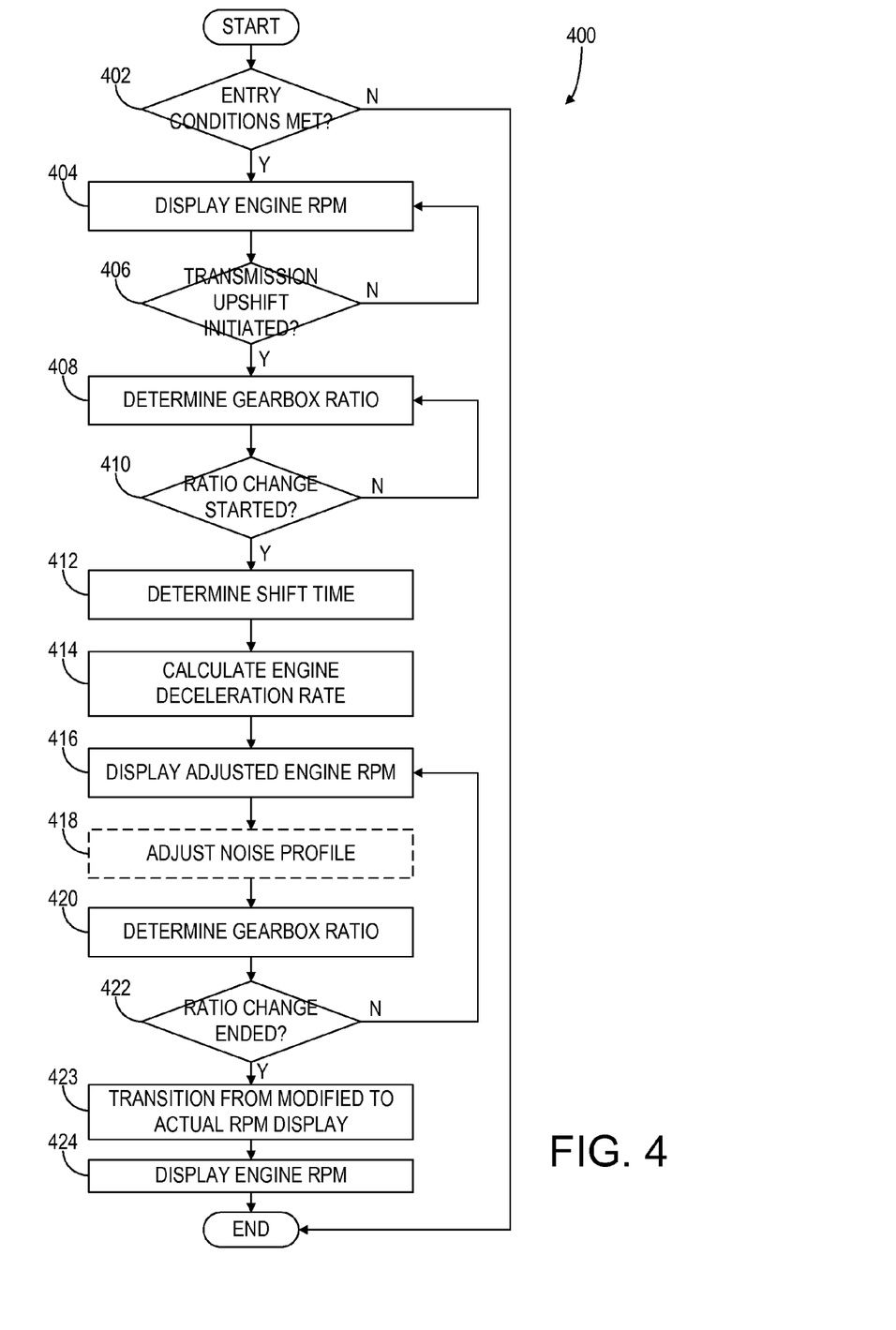
FIG. 4 shows an example method for operating a vehicle with a transmission in accordance with the disclosure.
Figure 5:
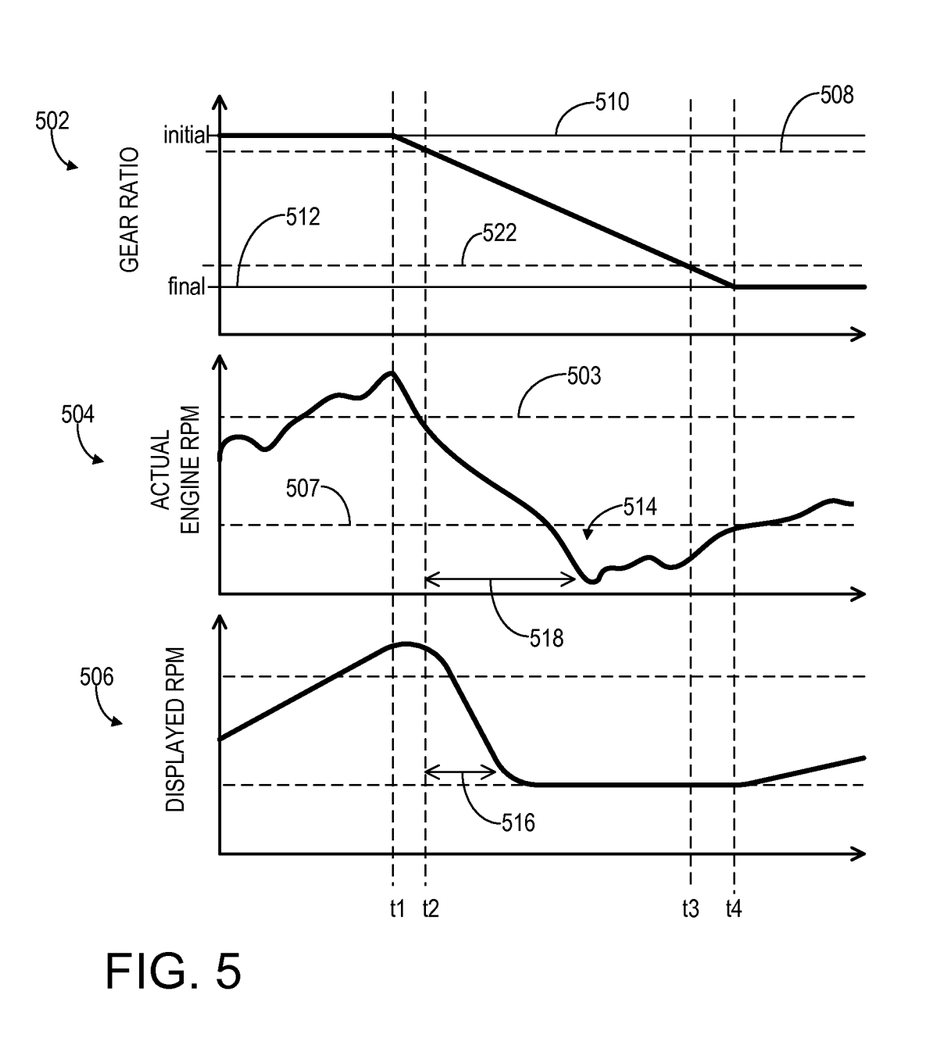
FIG. 5 shows example graphs illustrating engine operation during an upshift in accordance with the disclosure.

FIG. 4 shows an example method 400 for operating a vehicle with a transmission system to adjust transmission shift indications provided to a vehicle operator. Further, FIG. 5 shows example graphs illustrating engine operation during an example implementation of method 400 and will be described concurrently with FIG. 4. In particular, at 502, FIG. 5 shows an example graph of gear ratio versus time during an upshift. At 504, FIG. 5 shows an example graph of an actual or measured engine RPM versus time during an upshift. At 506, FIG. 5 shows an example graph of an engine RPM displayed to a vehicle operator during an upshift.

For example, indications of engine and/or vehicle performance provided to a vehicle operator, e.g., via a tachometer and/or noise profile, during a gear shift, e.g., during an upshift, may be adjusted in order to provide clear, quick, smooth, and consistent indications to the vehicle operator while controlling the powertrain for tactilely smooth, robust shifts.

At 402, method 400 includes determining if entry conditions are met. Entry conditions may be based on a mode of engine or vehicle operation. For example, entry conditions may be based on a driver selectable mode of vehicle operation, such as a selection of a sports mode. Entry conditions may be based on an automatically selected mode such as 'sporty' detected based on the nature of driver inputs. Further, in some examples, a vehicle operator may modify preferences for how indications of engine performance are indicated in the vehicle. Entry conditions may also be based on other vehicle and/or engine operating parameters, e.g., engine or vehicle load, speed, etc.

If entry conditions are met at 402, method 400 proceeds to 404. At 404, method 400 includes displaying engine RPM. For example, a measured engine speed may be displayed on a display device, e.g., display device 125 shown in FIG. 1. The display device may be a tachometer configured to indicate an engine speed or RPM to an operator of the vehicle. However, as shown for example at 504 in FIG. 5, the actual engine RPM may include noise and thus may, in some examples, be filtered before being displayed to a vehicle operator as shown at 506 in FIG. 5. For example, an actual engine speed profile may be displayed to the vehicle operator before and after a transmission shift. Further, in some examples, a first filter may be applied to the actual engine speed profile displayed to the vehicle operator before and after the transmission shift.

At 406, method 400 includes determining if a transmission upshift is initiated. For example, in response to a change in vehicle speed, engine speed, and/or load, a transmission upshift may be commanded, e.g., via a transmission control module or via input from a driver, to change from a first or initial gear to a second or final gear. For example, a gear ratio of the second or final gear may be less than a gear ratio of the first or initial gear during an upshift. For example, before time t1 in FIG. 5, a vehicle is operating with an initial gear as shown at 502. However, at time t1 a transmission shift is initiated from a first gear ratio to a second smaller gear ratio. For example, a gear change may be initiated after the engine RPM exceeds a synchronous speed 503 associated with the first gear by a threshold amount.

If a transmission upshift is not initiated at 406, method 400 continues to display engine RPM at 404. For example, an actual or filtered RPM may continue to be displayed to the driver without any further adjustments to the RPM signal sent to the tachometer for display to the vehicle operator. However, if at 406, a transmission upshift is initiated, then method 400 proceeds to 408.

At 408, method 400 includes determining the gearbox ratio. For example, following an initiation of a transmission upshift, the gear box ratio of the transmission may be monitored throughout a duration of the upshift. For example, the gear box ratio may be determined based on an input shaft speed and an output shaft speed of the transmission. For example, the gearbox ratio may calculated by dividing the input shaft speed by the output shaft speed.

At 410, method 400 includes determining if a gear ratio change has started. For example, the gearbox ratio determined at 408 may be compared to the initial gear ratio associated with the first or initial gear. For example, if the gearbox ratio is less than the initial gear ratio minus a threshold then it may be determined that a gear ratio change has started. For example, FIG. 5 shows a first gear ratio threshold 508. After initiation of the gear shift at time t1, the gear ratio may begin to change (decrease) until it falls below threshold 508 at time t2. This threshold may, for example, be a predetermined threshold for reducing errors in RPM display to the driver. For example, to reduce noise in the RPM displayed to the driver.

If a gear ratio change has not started at 410, method 400 continues to determine and monitor the gearbox ratio at 408. However, if at 410 a gear ratio change has started then method 400 proceeds to 412. For example, as shown in FIG. 5, at time t2 the gear ratio has fallen below threshold 508 at which point method 400 proceeds to 412 to begin adjustment of the engine speed displayed to the vehicle operator.

At 412, method 400 includes determining a shift time. For example, at 412 a desired perceived shift time may be determined based on a variety of parameters. For example, a desired perceived shift time may be determined from a predetermined look-up table in a memory component of a controller, e.g., controller 12. The shift time may be based on a current pedal position, e.g., an accelerator pedal position and may be further based on a current vehicle speed. The shift time may be further based on a shift lever position and/or a driver selected mode, e.g., sport mode, FE mode, manual shift select, etc. For example, different look-up table may be used in determining the shift time based on a driver selection and input.

At 414, method 400 includes calculating an engine deceleration rate. For example, a desired engine deceleration rate may be calculated at 414. The engine deceleration rate may be determined based on a synchronous speed for the first or initial gear and a synchronous speed for a second or final gear and the desired perceived shift time determined at 412. For example, the desired engine deceleration may be calculated as the difference between a synchronous speed for the initial gear and a synchronous speed for a final gear where the difference is divided by the desired perceived shift time. The engine deceleration rate for each shift may be calculated as a table lookup of pedal position, vehicle speed and shift lever or shift mode. In this way, the shifts can be crisper for sport mode versus FE mode and crisper at higher pedal positions, for example.

At 416, method 400 includes displaying an adjusted engine RPM to the vehicle operator. For example, during a transmission shift having a first engine speed profile, a second engine speed profile may be displayed to the vehicle operator, where the second profile has a smaller inertia phase than the first engine speed profile. This second engine speed profile may be displayed to the vehicle operator via a tachometer and may be based on the desired perceived shift time as determined at 412 and the desired engine deceleration rate as determined at 414.

Further, the second engine speed profile displayed to the vehicle operator may be based on the first speed profile and an inertia phase of the first profile.

For example, at 416, the RPM signal sent to the RPM display device may be calculated based on a measured or actual engine RPM and the desired engine deceleration rate determined at 414. For example, a signal sent to the RPM display device may be calculated as the actual or measured rpm, which may be filtered in some examples, minus delta time multiplied by the desired engine deceleration rate. The RPM signal sent to the RPM display device may further take a maximum of the synchronous speed for the second or final gear and the rpm signal described above. In this way, the phase of the shift as displayed to the vehicle operator may be shortened as compared with the actual engine RPM.

For example, as shown in FIG. 5 while the gear ratio changes from an initial value at 510 to a final value at 512, the actual engine RPM may change in a non-consistent and non-smooth manner as shown at 504 between time t1 and t4 during the gear change from the first to the second gear. The actual RPM may further include other inconsistencies. For example, the actual RPM of the engine may dip below a synchronous speed 507 of the second gear, e.g., as shown at 514 in FIG. 5, before rising to the synchronous speed 507. Thus, as shown at 506, the RPM displayed to the vehicle operator may be modified or adjusted in order to provide a clear, consistent, smooth indication of engine RPM to the driver during a shift event between time t1 and t4. By modifying the RPM signal sent to the display device to take a maximum of the synchronous speed for the second or final gear and the rpm signal described above, the inertia phase indicated at 516 in FIG. 5 may be shortened compared to the measured or actual inertia phase shown at 518. This shortened displayed inertia phase provided to the driver may increase the driver's satisfaction with vehicle performance during a shift event, for example.

Further, in some examples, a second filter may be applied to the RPM displayed to the vehicle operator at 416. For example, as remarked above, a first filter may be applied to the actual engine speed profile displayed to a vehicle operator before and after a transmission shift whereas a second filter may be applied to the second modified engine profile displayed to the vehicle operator at 416. An amount of filtering of this second filter may be less than an amount of filtering of the first filter. For example, the second filter may have less attenuation or higher bandwidth than the first filter. This second modified RPM displayed to the vehicle operator may indicate a smaller inertia phase to the vehicle operator and may show a faster rate of change of every speed than the first actual speed profile. For example, as shown in FIG. 5 at 504 and 506, a slope or rate of change of the displayed RPM may be greater than a corresponding slope or rate of change of the actual RPM at every engine speed in the inertia phase 516.

In this way, the engine speed as displayed on the tachometer is adjusted to reflect a desired engine speed profile instead of a reflection of actual engine speed during an upshift, which may include noise, inconsistencies and unclear information for a vehicle operator. The adjusted RPM is based on a model of the transmission gear ratios, vehicle acceleration, slip targets or torque converter characteristics (as appropriate) to provide a displayed engine speed that drops in a quick, consistent way.

At 418, method 400 may optionally include adjusting a noise profile in a cabin of the vehicle, e.g., cabin 103. For example, the transmission shift may have a first engine sound profile at the driver's ear based on actual engine behavior and, at 418, method 400 may further include producing a sound wave to replace the first engine sound profile with a second desired sound profile, where the second sound profile is based on the second engine speed profile described above. In some examples, the first sound profile may be cancelled by an active noise control system and substituted with the second sound profile. For example, an engine sound intensity profile may be provided to the vehicle operator during a gear change to reflect the change in engine note or frequency when torque is reduced during the inertia phase of the gear shift. Based on this engine speed and sound intensity profile, the active noise control system 131, which may include microphones to measure sound levels in the cabin and amplifiers to produce complementary or cancelling sound waves through the car's speaker system, may be used to cancel the sound from the engine during the shift and replace it with the desired sound profile which matches the profile displayed on the tachometer.

At 420, method 400 includes determining the gearbox ratio. For example, as remarked above, throughout the gear shift process, the gearbox ratio may be monitored to determine a state of the gear shift change. For example, the gear box ratio may be determined based on an input shaft speed and an output shaft speed of the transmission, as described above.

At 422, method 400 includes determining if the gear ratio change has ended. For example the gearbox ratio may be compared to a final gear ratio associated with the second or final gear. For example, if the gearbox ratio is less than the final gear ratio plus a threshold value then it may be determined that the gear shift has ended. For example, at time t3 in FIG. 5, the gear ratio falls below a second threshold 522 associated with the final gear. This threshold may, for example, be a predetermined threshold for reducing errors in RPM display to the driver. For example, to reduce noise in the RPM displayed to the driver.

If the gear ratio change has not ended at 422, then method continues displaying an adjusted engine RPM and optionally adjusting the noise profile at 416 and 418. However, if the gear ratio change has ended at 422, method 400 proceeds to 423. At 423, method 400 includes transitioning from the modified RPM display to an actual or measured RPM display. For example, as remarked above, an actual engine speed profile may be displayed to the vehicle operator before and after the transmission shift. The RPM displayed to the vehicle operator may be continuously transitioned from the actual engine speed profile to the second modified engine speed profile after a shift has begun. Likewise, the RPM displayed to the vehicle operator may be continuously transitioned from the second engine speed profile to the actual engine speed profile after a shift has ended. For example, the RPM signal sent to the RPM display device may be ramped to the measured or actual RPM over a calibratable time window so that the measured or actual RPM (with or without filtering) may again be displayed to the vehicle operator without any further adjustments after completion of the shift from the first to the second gear at 424.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle comprising:
   shifting a transmission of the vehicle and during the transmission shift having a first engine speed profile, displaying a second engine speed profile to a vehicle operator, the second profile indicating a smaller inertia phase than the first engine speed profile; and
   before and after the transmission shift, applying a first filter to the first engine speed profile and during the transmission shift, applying a second filter to the second engine speed profile, where an amount of filtering of the second filter is less than an amount of filtering of the first filter;
   wherein the second engine speed profile is based on a desired perceived shift time and a desired engine deceleration rate and the first profile is an actual engine speed profile, where a duration of the inertia phase of the second engine speed profile is based on the desired perceived shift time and the desired perceived shift time is based on a driver selection.

2. The method of claim 1, wherein the shifting the transmission is performed in response to a signal from an electronic controller in communication with the transmission and wherein the transmission shift is an upshift from a first gear ratio to a second smaller gear ratio.

3. The method of claim 1, wherein the second engine speed profile is displayed to the vehicle operator via a tachometer.

4. The method of claim 1, wherein the second filter has less attenuation or higher bandwidth than the first filter.

5. The method of claim 4, wherein the desired perceived shift time is based on a shift lever position, vehicle speed, accelerator pedal position, and initial or final gear number/ratio.

6. The method of claim 4, wherein the desired perceived shift time is based on a driver selected or automatically selected transmission operating mode, where the driver selected transmission operating mode includes one of a sport mode, FE mode, and manual shift select.

7. The method of claim 4, wherein the transmission shift is from a first gear to a second gear and the desired engine deceleration rate is based on synchronous speeds for the first and second gears and the desired perceived shift time.

8. The method of claim 4, wherein the second engine speed profile is adjusted based on the desired engine deceleration rate.

9. The method of claim 1, wherein the transmission shift has a first engine sound profile at the vehicle operator's ear based on actual engine behavior and the method further comprises producing a sound wave to replace the first engine sound profile with a second desired sound profile, the second sound profile based on the second engine speed profile.

10. The method of claim 9, further comprising canceling the first sound profile and substituting the second sound profile.

11. A method for a vehicle, comprising:
shifting a transmission of the vehicle;
displaying an actual engine speed profile before and after the transmission shift, where a first filter is applied to the actual engine speed profile; and
during the transmission shift having a first engine speed profile, displaying a second modified engine speed profile to a vehicle operator, wherein the second modified engine speed profile shows a faster rate of change of engine speed than the first engine speed profile, where a second filter is applied to the second modified engine speed profile and an amount of filtering of the second filter is less than an amount of filtering of the first filter;
wherein the second modified engine speed profile shows a shorter duration of an inertia phase than the first engine speed profile wherein the duration of the inertia phase of the second modified engine speed profile is based on a desired perceived shift time determined based on a driver input and wherein the rate of change of the second modified engine speed profile is based on a desired engine deceleration rate.

12. The method of claim 11, wherein the transmission shift is an upshift from a first gear ratio to a second smaller gear ratio and wherein the shifting the transmission is performed in response to a signal from an electronic controller in communication with the transmission.

13. The method of claim 11, wherein the desired perceived shift time is based on a driver selected transmission operating mode, where the driver selected transmission operating mode includes one of a sport mode, FE mode, and manual shift select.

14. The method of claim 11, wherein the transmission shift is from a first gear to a second gear and the desired engine deceleration rate is based on synchronous speeds for the first and second gears and the desired perceived shift time.

15. The method of claim 11, further comprising smoothly transitioning from the second modified engine speed profile to the actual engine speed profile after the transmission shift.

16. The method of claim 15, wherein the second filter has less attenuation or higher bandwidth than the first filter.

17. A method for a vehicle, comprising:
shifting a transmission of the vehicle;
before and after the transmission shift, displaying an actual engine speed profile to a vehicle operator, where the displayed actual engine speed profile is filtered with a first filter; and
during the transmission shift having a first engine speed profile, adjusting a transmission shift indication provided to the vehicle operator based on a desired perceived shift time and a desired engine deceleration rate, where the transmission shift indication includes a display of a modified engine speed profile, where the modified engine speed profile is modified from the first engine speed profile and filtered with a second filter, where an amount of filtering of the second filter is less than an amount of filtering of the first filter;
wherein adjusting the transmission shift indication provided to the vehicle operator includes adjusting a duration of an inertia phase and a rate of change of the transmission shift indication, where the duration of the inertia phase is based on the desired perceived shift time which is based on a driver selection including one or more of a shift level position, a current pedal position, and vehicle speed, and further includes adjusting a transmission shift noise profile provided to the vehicle operator.

18. The method of claim 17, wherein shifting the transmission includes shifting the transmission in response to a command to shift the transmission from an electronic controller in communication with the transmission, where the command is generated in response to one or more of a change in vehicle speed, engine speed, and engine load.

* * * * *